United States Patent [19]
Bower, Jr.

[11] 4,291,799
[45] Sep. 29, 1981

[54] PARALLEL TUBE RESIN CAPSULES
[75] Inventor: Arnold B. Bower, Jr., Bristol, Va.
[73] Assignee: General Electric Company, Worthington, Ohio
[21] Appl. No.: 87,471
[22] Filed: Oct. 23, 1979
[51] Int. Cl.³ ............ B65D 25/08; B65D 30/22; B65D 81/32
[52] U.S. Cl. .................... 206/219; 206/568
[58] Field of Search ............ 206/219, 568; 229/56

[56] References Cited
U.S. PATENT DOCUMENTS
| | | | |
|---|---|---|---|
| 3,737,027 | 6/1973 | Ball | 206/568 |
| 3,749,620 | 7/1973 | Montgomery | 206/219 |
| 3,861,522 | 1/1975 | Llewellyn et al. | 206/219 |
| 3,891,138 | 6/1975 | Glas | 206/219 |
| 4,007,831 | 2/1977 | Bernhardt | 229/56 |

*Primary Examiner*—William T. Dixson, Jr.
*Attorney, Agent, or Firm*—Morgan, Finnegan, Pine, Foley & Lee

[57] ABSTRACT

A parallel tube resin bolting package is disclosed for use in resin bolting operations. The composite package has a generally figure 8 shape in cross-section, with one compartment containing a polyester resin while the other compartment contains a hardener composition. The resin bolting package is particularly useful in applications where the pre-drilled hole has a relatively small diameter.

7 Claims, 3 Drawing Figures

PARALLEL TUBE RESIN CAPSULES

This invention relates to a composite package consisting of two parallel tubular containers filled with a polyester resin and a catalyst, respectively. More particularly, the parallel, generally tubular containers are joined in side by side relation along a longitudinal axis and have a generally figure 8 shape in cross-section. The composite package is particularly useful in conjunction with pre-drilled holes having a relatively small diameter, as for example, when securing a safety reflector to a bridge abutment, post, highway center line, or in various forms of building construction such as room dividers or partition bases, and even including household applications such as securing frames or other items to walls, etc.

BACKGROUND OF THE INVENTION

In the prior art, resin bolting systems have been employed where it was necessary to securely fix a bolt into a hole previously drilled in a hard substrate, such as rock or concrete. It has been found that purely mechanical bolting gave rise to certain problems such as insecure or unstable bolting, as well as possible pilferage of the bolt. More particularly, when a mechanical bolt is placed into rock or cement, crumbling of the substrate around the bolt will cause the bolt to loosen and possibly fall out. In addition, mechanical bolts are susceptible to pilferage in that they can be unscrewed and removed.

To remedy these problems, resin bolting systems were developed wherein a polyester resin mixed with a catalyst is pumped into a pre-drilled hole whereupon a bolt is inserted before the polyester resin has fully cured. By this method, the bolt is permanently affixed in the substrate thereby preventing pilferage. In addition, the polyester resin fills in the cracks in the bolt hole and stabilizes the frangible walls of the hole so that the bolt is provided with a secure, rigid and permanent support.

The process of mixing a combination of a polyester resin and a catalyst in the required proportions and thereafter pumping the composition into a hole is both difficult and time-consuming. To obviate these shortcomings, prior art devices have been developed wherein a resin and a catalyst are placed in a capsule in fixed amounts. One of these capsules may then be placed in a bolt hole at the time when the bolting is to take place. The subsequent insertion of the bolt funtions to rupture the filled capsule such that the catalyst and the resin are mixed to form the hardened composition for securing the bolt. It has been found that rotation of the bolt simultaneously with its insertion into the bolt hole insures that the catalyst and the resin become fully mixed.

Examples of the resin capsules used in the prior art include U.S. Pat. No. 3,737,027 to Ball and U.S. Pat. No. 3,861,522 to Llewellyn et al. The former patent discloses a two component hardening resin system which comprises two flexible frangible containers, one of which is disposed entirely within the other. In this system, a catalyst, the generally smaller component, is placed in a frangible tube. A larger frangible tube, which entirely surrounds the inner tube holding the catalyst, is filled with a polyester resin. This entire assembly may then be inserted into a bolt hole so that when the bolt is inserted and rotated, it will rupture the frangible walls of the container allowing the resin and catalyst to mix thereby forming the hardening resin system.

In contrast, U.S. Pat. No. 3,861,522 to Llewellyn discloses a resin system wherein a tubular, compartmented package has a flexible divider wall therein. The divider wall separates the tubular package into two compartments such that the resin may be placed into one compartment and the catalyst placed into the other compartment. As in U.S. Pat. No. 3,737,027 to Ball, the entire tube is then placed into the bolt hole followed by the insertion of the bolt. The bolt ruptures the walls of the container enabling the resin and the catalyst to mix such that the resin will cure forming a secure bolting system.

The above described resin bolting systems are used primarily in mine roof bolting, wherein bolt holes are drilled having a diameter of generally one to two inches. However, when the bolt hole is to be less than half an inch in diameter, it becomes unfeasible to use a complex compartment within a compartment resin bolting package. Typical of an application wherein the bolt hole has a relatively small diameter is the installation of a safety reflector in a cement structure such as a bridge abutment, post, or a highway center divider. More particularly, when installing bolts for highway safety reflectors, bolt holes of only 5/16 of an inch in diameter and having a depth of approximately 2½ inches are used, such that the cost of producing a compartment within a compartment resin package becomes prohibitive.

Therefore, it is an object of the subject invention to provide a parallel tube resin package for use in conjunction with bolt holes having a relatively small diameter and short depth.

It is a further object of the subject invention to provide a parallel tube resin package which is both economical to produce and easy to use.

DESCRIPTION OF THE INVENTION

According to the present invention, there is provided a parallel tube resin package which consists of two individual tubular compartments joined along a longitudinally extending side edge and having an essentially figure 8 shape in cross-section. The parallel tubes are made of a frangible material, with one of the tubes being filled with a polyester resin while the other tube is filled with a catalyst. The parallel tube resin package is intended to be placed into a pre-drilled hole having a relatively small diameter, whereupon a bolt may be inserted and rotated in said hole thereby rupturing the frangible walls of the package and allowing the components to mix. By having the resin and the catalyst placed in individual parallel tubes which are joined at their centers, manufacturing costs may be substantially reduced while, in addition, a relatively small package may be produced. More specifically, the parallel tube resin package of the subject invention avoids the necessity of producing a complex tube within a tube structure for use in a small diameter bolt hole.

In accordance with the subject invention, the polyester resin may be any one of those resins commonly used in the art such as ethylene glycol, propylene glycol, or diethylene glycol. The resin portion may further include unsaturated dicarboxylic acids and their anhydrides and in addition, cross linking substances such as styrene. The hardener or catalyst component may contain, for example, peroxide organic acids to promote cross linking reactions.

The frangible walls of the tubes are generally formed from synthetic plastic films, for example, films of polyethylene, polypropylene and polyvinylchloride. The tube endings may be tied off with wire, string, tape, or a compressible metal clip. Alternatively, the walls of the tube may be made of a thermoplastic material such that the ends of the tube may be heat sealed. The elongated tubular containers are then placed in side by side relation, along their longitudinal axes and joined therebetween. The tubes may be joined by an adhesive, or in the case wherein the tubes are formed from a thermoplastic material they may be joined by a heat seal. It should be noted however, that the above references concerning the type of resin, hardener, capsule joining and sealing are cited merely for illustrative purposes and are not intended to limit the scope of the subject invention.

The separate but adjacent tubes, containing the resin and the catalyst in the required proportions, may be placed in a bolt hole having a relatively small diameter. Insertion and rotation of a bolt in the bolt hole will cause rupturing of the walls of the tubes thereby enabling the components to mix. When the resin hardens a secure bolting is achieved.

DESCRIPTION OF THE PREFERRED EMBODIMENT

Figure 1:
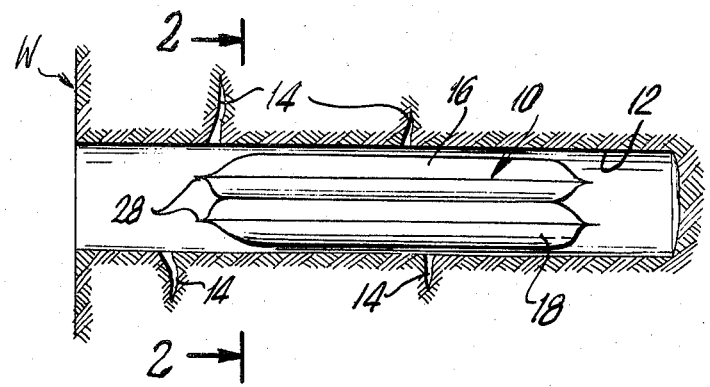
FIG. 1 is an elevational view of the parallel tube resin package of the subject invention as located within a bolt hole.
Figure 2:
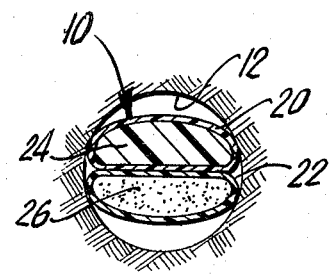
FIG. 2 is a cross-sectional view taken along line 2—2 in FIG. 1 of the parallel tube resin package of the subject invention.

As illustrated in FIGS. 1 and 2, the parallel tube resin package of the subject invention is generally designated by the numeral 10 and is shown inserted into a bolt hole 12 of relatively small diameter, provided in concrete wall W. Usually, drilling a hole into frangible material such as concrete will result in the hole exhibiting numerous internal cracks or fissures 14.

Resin package 10 basically comprises two elongated parallel tubes 16 and 18 which are disposed and joined in side by side relation along their longitudinal axes. As illustrated in FIG. 2, the parallel tube resin package 10 assumes a generally figure 8 shaped in cross-section, with the total diameter of the package being less than the diameter of the bolt hole 12.

The walls 20, 22 of the elongated tubes are frangible and are generally formed from synthetic plastic films for example, polyethylene, polypropylene or polyvinylchloride. The tubes 16 and 18 are filled with a polyester resin 24 and a catalyst 26, respectively. Conventional resins such as ethylene glycol, propylene glycol, or diethylene glycol maleates or fumarates are generally employed, in conjunction with a typical catalyst such as an organic peroxide. The relative size of the elongated tubes 16 and 18 permit the tubes to be filled with premeasured amounts of the resin 24 and the catalyst 26. By this arrangement, a proper mixing ratio is obtained when the walls of the tubes are ruptured for fast, uniform, and complete hardening. A typical example of the types and ratios of resin and catalyst which may be used with the subject invention is disclosed in U.S. Pat. No. 3,737,027 to Ball. After the tubes 16 and 18 are respectively filled with the resin 24 and the catalyst 26, they are tied off at the open ends thereof with a wire 28, although any suitable tying means such as a string, or a metal clip is satisfactory. If the walls 20, 22 of the tubes 16, 18 are formed from a thermoplastic material, the ends may be closed by heat sealing. The tubes are then joined along their longitudinal axis by an adhesive, as more particularly shown in FIG. 2. In the alternative, when the walls 20, 22 of the tubes 16, 18 are formed from a thermoplastic material, the tubes may be joined by heat sealing.

Figure 3:
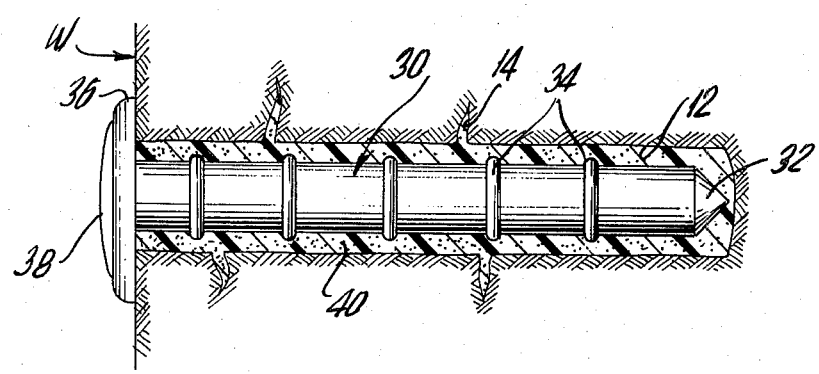
FIG. 3 is a view similar to FIG. 1 after insertion of the bolt into the bolt hole.

After the resin package 10 has been placed in the bolt hole 12, the bolt 30 is inserted therein. As illustrated in FIG. 3, bolt 30 is provided with a tapered end 32, and a plurality of knurls or annular projections 34 to enhance the bonded connection between the bolt 30 and the cured two-part plastic producing system of the resin 24 and catalyst 26 thereby increasing the stability of the bolting system. When, for example, the bolting system is to be used in conjunction with a highway safety reflector, the head of the bolt 36 may be provided with a circular reflector 38 attached thereto.

As the bolt 30 is inserted into the bolt hole 12, the tapered end 32 functions to rupture the frangible walls 20 and 22 of the tubular containers 16 and 18 thereby causing the resin 24 and the catalyst 26 to mix. Preferably, bolt 30 is rotated while it is inserted such that a complete mixture of the resin and catalyst is obtained. In a short period of time the mixture solidifies into a hardened two-part plastic system 40 which, as illustrated in FIG. 3, rigidly secures the bolt to the bolt hole 12 of the wall W. Further, the hardened plastic system 40 functions to fill in the cracks 14 in the frangible concrete wall W and thus, forms a secure bond between the walls of the bolt hole 12 and the bolt 30. In addition, a resin set bolt discourages the pilferage problems associated with mechanical bolting in that the resin set bolt cannot be readily removed. Further, a parallel tube resin package 10 made in accordance with the subject invention eliminates the complex tube within a tube arrangement of the prior art and therefore helps to minimize manufacturing costs.

It is to be understood that changes may be made in the particular embodiment of the invention in light of the above teachings, but that these will be within the full scope of the invention as defined by the appended claims.

I claim:
1. A resin bolting package comprising:
two elongated tubular containers formed from a frangible material, and disposed in side by side relation along the longitudinal axes of said elongated tubular containers and joined therebetween such that said package has a configuration which is generally a figure 8 shape in cross-section, with one of said tubular containers being filled with a polyester resin, and with the other said tubular container being filled with a hardener, such that said resin bolting package may be placed in a pre-drilled hole whereby when a bolt is thereafter inserted in said hole, said frangible tubular containers are ruptured with the contents therein mixing and forming a cured two-part plastic producing system for securing the bolt.
2. A resin bolting package as recited in claim 1 wherein said tubular containers are joined together by an adhesive.
3. A resin bolting package as recited in claim 1 wherein said tubular containers are formed from a ther- moplastic material and are joined together by a heat seal.

4. A resin bolting package as recited in claim 1 wherein said frangible tubular containers are made from a synthetic plastic film.

5. A resin bolting package comprising:
two elongated tubular containers, formed from a frangible synthetic plastic film and disposed in side by side relation along the longitudinal axes of said elongated containers and joined therebetween, such that said resin bolting package has a configuration which is generally figure 8 shaped in cross-section, with one of said tubular containers being filled with a polyester resin, and with the other said tubular container being filled with a hardener, such that said resin bolting package may be placed in a pre-drilled hole whereby when a bolt is thereafter inserted in said hole, said frangible tubular containers are ruptured with the contents therein mixing and forming a cured two-part plastic producing system thereby securing the bolt.

6. A resin bolting package as recited in claim 5 wherein said tubular containers are joined by an adhesive.

7. A resin bolting package as recited in claim 5 wherein said synthetic plastic film is a thermoplastic material and said tubular containers are joined together by a heat seal.

* * * * *